(12) United States Patent
Sakata et al.

(10) Patent No.: US 7,028,317 B2
(45) Date of Patent: Apr. 11, 2006

(54) OPTICAL DISC DEVICE HAVING AN INCLINED GUIDED MEMBER TO CONTROL THE DIRECTION OF LIGHT

(75) Inventors: Masaya Sakata, Tokyo (JP); Masaaki Nio, Tokyo (JP); Noriyuki Kato, Tokyo (JP)

(73) Assignee: Teac Corporation, Tokyo (JP)

( * ) Notice: Subject to any disclaimer, the term of this patent is extended or adjusted under 35 U.S.C. 154(b) by 293 days.

(21) Appl. No.: 10/326,032

(22) Filed: Dec. 18, 2002

(65) Prior Publication Data

US 2003/0128649 A1    Jul. 10, 2003

(30) Foreign Application Priority Data

Jan. 8, 2002   (JP) .............................. 2002-001322

(51) Int. Cl.
  *G11B 17/30*   (2006.01)
(52) U.S. Cl. .................................... 720/674
(58) Field of Classification Search ................ 369/249, 369/244; 720/674, 675, 681; 360/132
See application file for complete search history.

(56) References Cited

U.S. PATENT DOCUMENTS 4,829,508 A * 5/1989 Arita .......................... 720/691
4,996,619 A * 2/1991 Negishi et al. ........... 360/294.1
5,182,739 A * 1/1993 Kime et al. .................. 720/674
5,708,646 A * 1/1998 Furusawa ............... 369/112.01
5,995,479 A * 11/1999 Takizawa et al. ........... 720/675
6,449,230 B1 * 9/2002 Seto ......................... 369/44.14
6,483,798 B1 * 11/2002 Wu ............................ 720/676
6,493,309 B1 * 12/2002 Sogawa et al. ............. 720/674

FOREIGN PATENT DOCUMENTS

JP            09198687 A      1/1996

* cited by examiner

*Primary Examiner*—George J. Letscher
*Assistant Examiner*—Christopher R. Magee
(74) *Attorney, Agent, or Firm*—Anderson Kill & Olick, P.C.; Eugene Lieberstein; Michael N. Heller

(57) ABSTRACT

An optical disk device performing data reproducing and/or data recording of a disk with the disk being clamped and rotated. The disk device has a simple structure in which light emitted from an optical pickup can be securely made incident on the disk at right angles. The disk device includes the optical pickup for reproducing or recording on the disk clamped by a clamping mechanism, and an optical pickup driving mechanism. The optical pickup includes a guided part. The optical pickup driving mechanism includes a guide shaft for guiding the movement of the optical pickup via the guided part of the optical pickup. The center axis of the guided part is shifted from the direction perpendicular to the direction of light emitted from the optical pickup so that the direction of light emitted from the optical disk can make an approximately right angle with the disk surface.

20 Claims, 7 Drawing Sheets

OPTICAL DISC DEVICE HAVING AN INCLINED GUIDED MEMBER TO CONTROL THE DIRECTION OF LIGHT

BACKGROUND OF THE INVENTION

1. Field of the Invention

The present invention relates to a disk device, and particularly to a disk device for performing a reproducing process or a recording process by rotating a clamped disk.

2. Description of the Related Art

A compact disk whose data are reproduced by a laser type pickup (or an optical pickup) is increasingly used as a storing medium that stores information for software, a database, and the like. Accompanying the increasing use of the compact disk, a disk device (a CD-ROM drive device, or a magnetic optical disk device) that can be incorporated in a chassis of a miniaturized laptop computer has been developed.

Figure 1A:
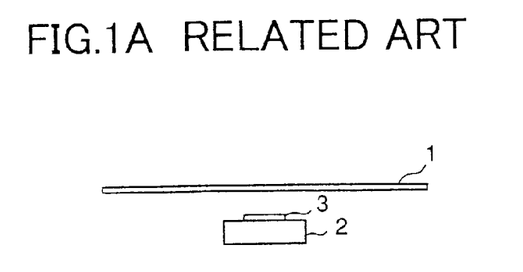
FIGS. 1A to 1C are illustrations showing a cause of warping of a disk.

The disk device includes a storing medium attaching unit for moving a disk between an attached position where a reproducing process is performed and a detachment position where the disk is attached to the disk device or is detached from the disk device. The disk device further includes a disk rotating mechanism for rotating the disk at a predetermined rotational speed. As shown in FIG. 1A, this disk rotating mechanism includes a turning table 2, a clamping mechanism 3, and a spindle motor (not shown). A disk 1 is clamped (or fixed) to the clamping mechanism (or the fixing mechanism) 3 so as to be fixed to the turning table 2. With the disk 1 being fixed to the turning table 2, the disk 1 is rotated at a high speed.

Figure 1B:
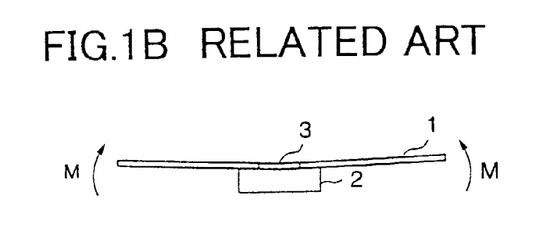
Figure 1C:
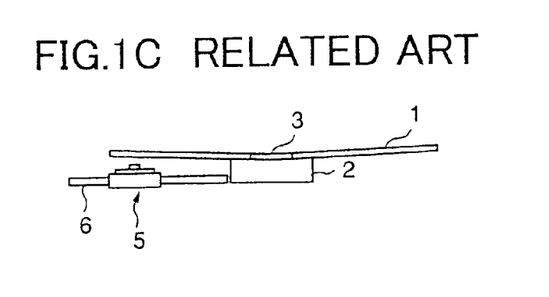

However, since the clamping mechanism 3 clamps the center part of the disk 1, the disk 1 is warped in the direction indicated by the arrows M in FIG. 1B. As a result, when an optical pickup 5 that is guided by a guide shaft 6 to move in the radial directions of the optical disk 1 performs a reproducing process or a recording process, light emitted from the optical pickup 5 does not strike the thus-warped optical disk 1 orthogonally. For this reason, accuracy in a spot on the disk 1 being struck by light from the optical pickup 5 is reduced, and therefore, recording quality and reproducing quality are greatly reduced.

Figure 2:
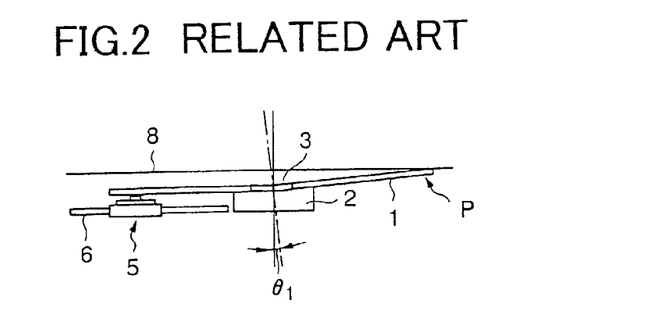
FIG. 2 shows a first example of a disk device in the related art.
Figure 3:
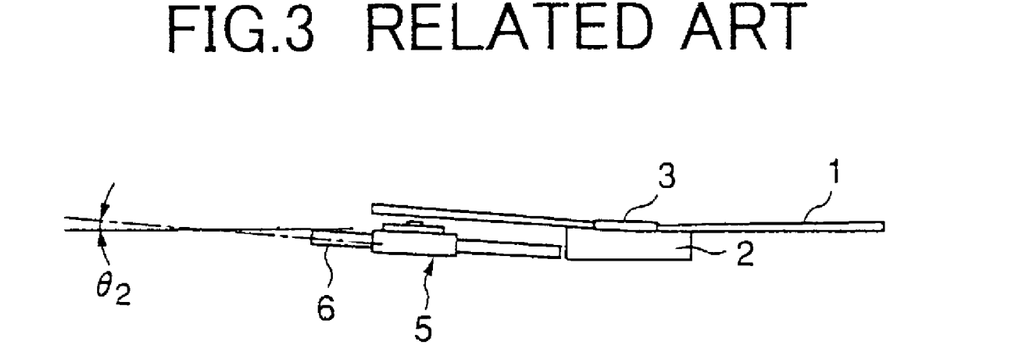
FIG. 3 shows a second example of a disk device in the related art.
Figure 4:
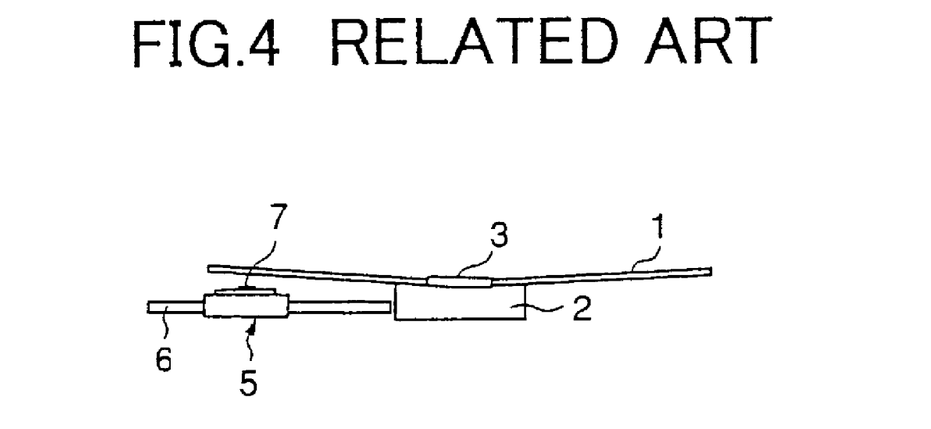
FIG. 4 shows a third example of a disk device in the related art.

In order to solve this problem, methods shown in FIGS. 2 to 4 have been proposed. In the method of FIG. 2, the light from the optical pickup 5 is made to strike the optical disk 1 vertically relative to the optical disk 1 by inclining a rotational shaft (not shown) of the turning table 2 by the angle θ1 from the vertical direction.

In the method of FIG. 3, the light from the optical pickup 5 strikes the optical disk 1 vertically relative to the optical disk 1 by inclining the guide shaft 6 by the angle θ2 from the horizontal direction.

In the method of FIG. 4, an object lens 7 of the optical pickup 5 is inclined so as to conform to the warping of the optical disk 1 while the rotational shaft of the turning table 2 is directed vertically, and the guide shaft 6 is directed horizontally. Thereby, the light from the optical pickup 5 strikes the optical disk 1 orthogonally.

However, in the method shown in FIG. 2, since the turning table 2 is inclined, the right side of the optical disk 1 in FIG. 2 opposite the left side of the optical disk facing the optical pickup 5 becomes close to a top cover 8 of the optical disk device. Accordingly, in the worst case, the optical disk 1 makes contact with the top cover 8 at the position indicated by the arrow P of FIG. 2, and the optical disk 1 can be damaged. This becomes a big problem in the case of an optical disk device that is incorporated in equipment such as a laptop computer, which is desirably thin.

Furthermore, in the method shown in FIG. 3, in order to incline the guide shaft 6, various components such as a screw shaft and a stepping motor for driving the optical pickup 5 must also be inclined in accordance with the inclination of the guide shaft 6. As a result, assembling quality or accuracy is degraded. In addition, since the stepping motor is arranged so as to be inclined, the thickness of the optical disk device (or vertical size of the optical disk device) becomes larger than that in a case where the stepping motor is horizontally arranged.

Further, in the method shown in FIG. 4, when the object lens 7 has coma aberration, accuracy in a spot on the disk being struck by the light from the optical pickup 5 is reduced, and recording/reproducing characteristics can be degraded.

SUMMARY OF THE INVENTION

In view of the foregoing, it is an object of the present invention to provide a disk device that enables the light emitted from an optical pickup to strike an optical disk orthogonally (i.e., vertically relative to the optical disk) by a simple structure of the disk device.

In order to achieve this object, the present invention is characterized by the following aspects.

According to one aspect of the present invention, there is provided a disk device including an optical pickup that reproduces data of a clamped disk and includes a guided member, and an optical pickup driving mechanism having a guide member for guiding movement of the optical pickup via the guided member of the optical pickup. Specifically, in this disk device, the guided member of the optical pickup has a center axis inclined from a direction perpendicular to a direction of light emitted from the optical pickup so that the direction of light emitted from the optical pickup can make an approximately right angle with a surface of the clamped disk.

According to another aspect of the present invention, there is provided a disk device including a disk rotating mechanism for clamping a disk and rotating the clamped disk, an optical pickup that reproduces data of the disk and includes a guided member, and an optical pickup driving mechanism that includes a guide member for guiding movement of the optical pickup via the guided member of the optical pickup. Specifically, in this disk device, the guided member of the optical pickup has a center axis inclined from a direction parallel with a surface of the optical pickup that faces the clamped disk so that a direction of light emitted from the optical pickup can make an approximately right angle with a surface of the disk.

According to another aspect of the present invention, there is provided a disk device including a disk rotating mechanism for clamping a disk and rotating the clamped disk, an optical pickup that includes a guided member, an upper surface facing the disk, and a lower surface, and that reproduces data of the disk, and an optical pickup driving mechanism including a guide member for guiding movement of the optical pickup via the guided member of the optical pickup. Specifically, in this disk device, the guided member of the optical pickup has a center axis inclined from a direction parallel with the lower surface of the optical pickup so that a direction of light emitted from the optical pickup can make an approximately right angle with a surface of the clamped disk.

According to another aspect of the present invention, in any one of the above-described disk devices, the guide member includes a guide shaft.

According to another aspect of the present invention, the optical pickup driving mechanism guides movement of the optical pickup via the guided member in the directions of the center axis of the guided member.

Any one of the above-described disk devices may be configured such that the center axis of the guided member is shifted from the direction perpendicular to the direction of light emitted from the optical pickup, and the center axis of the guided member is perpendicular to the direction of the center axis of the rotational shaft of the disk rotating mechanism. In this manner, with the simple structure, the light emitted from the optical pickup can securely strike the disk perpendicularly relative to the disk. In other words, the simple structure makes the light emitted from the optical pickup incident on the surface of the disk at right angles.

In the above-described disk devices, since the direction of the center axis of the rotational shaft of the disk rotating mechanism is not shifted from the vertical direction, when the size of the disk device is small, the disk attached to the disk device does not contact against the case of the disk device. Since the guide member (the guide shaft) for guiding the movement of the optical pickup need not be inclined, accuracy in attaching each element to the disk device is not reduced. Furthermore, if the lens of the optical pickup having coma aberration is inclined, accuracy in a spot on the disk being struck by the light from the optical pickup is reduced. However, in the above-described disk devices, the lens of the optical pickup need not be inclined, so that accuracy in a spot being struck by the light from the optical pickup is not reduced.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

Embodiments of the present invention will be described with reference to the drawings.

Figure 5:
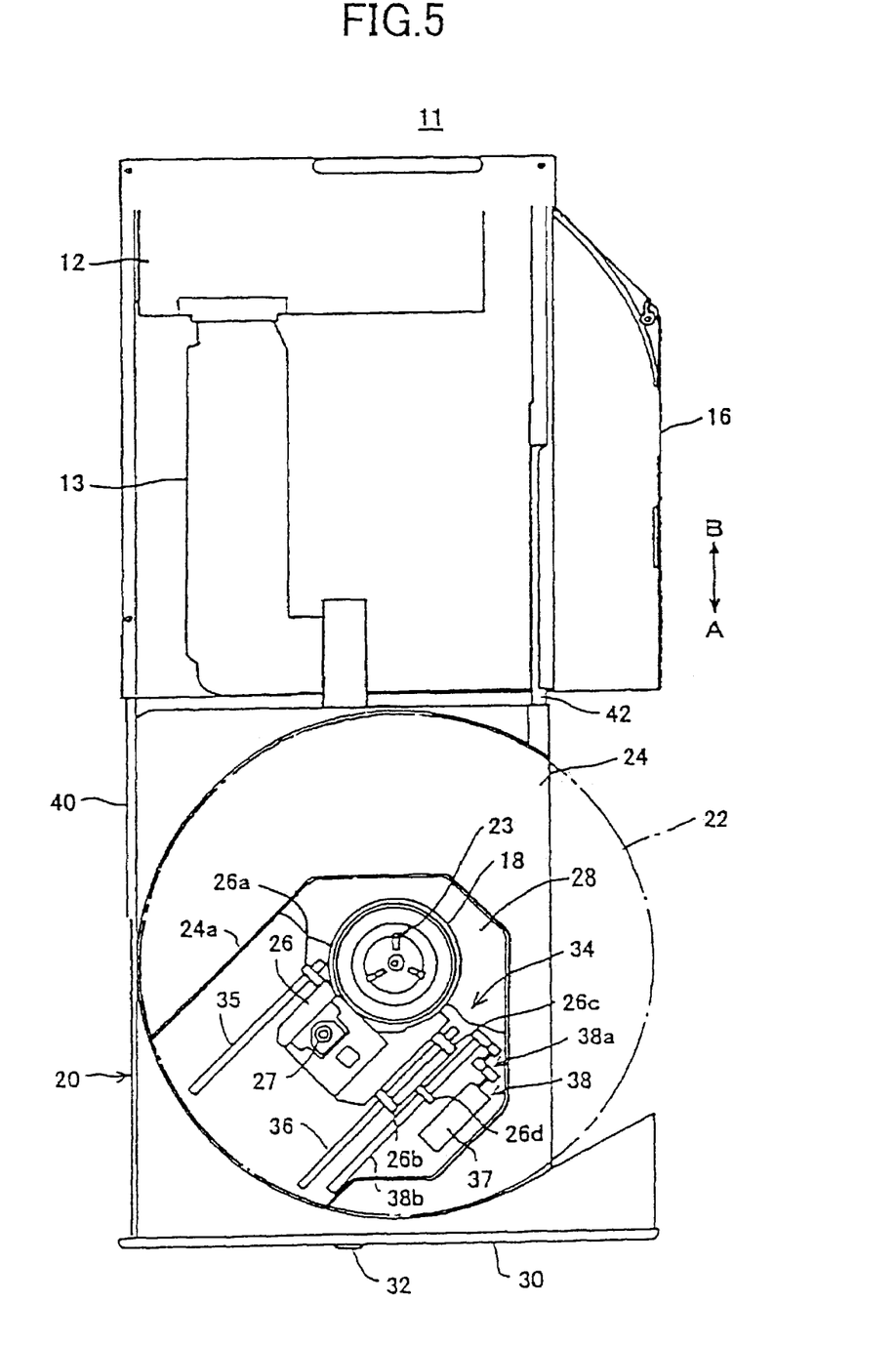
FIG. 5 is a plan view showing a disk device with a tray of the disk device being pulled out, according to one embodiment of the present invention.
Figure 6:
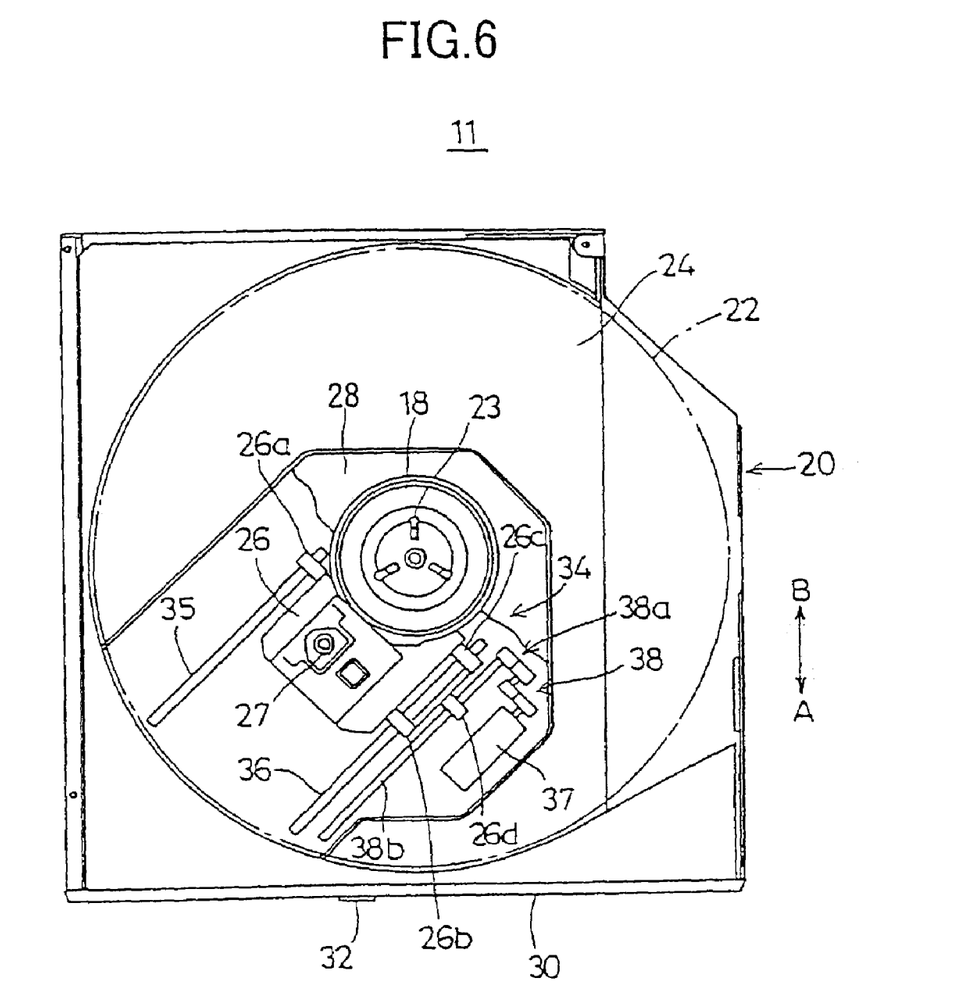
FIG. 6 is a plan view showing the disk device of FIG. 5 with the tray being drawn back to a disk attached position.
Figure 7:
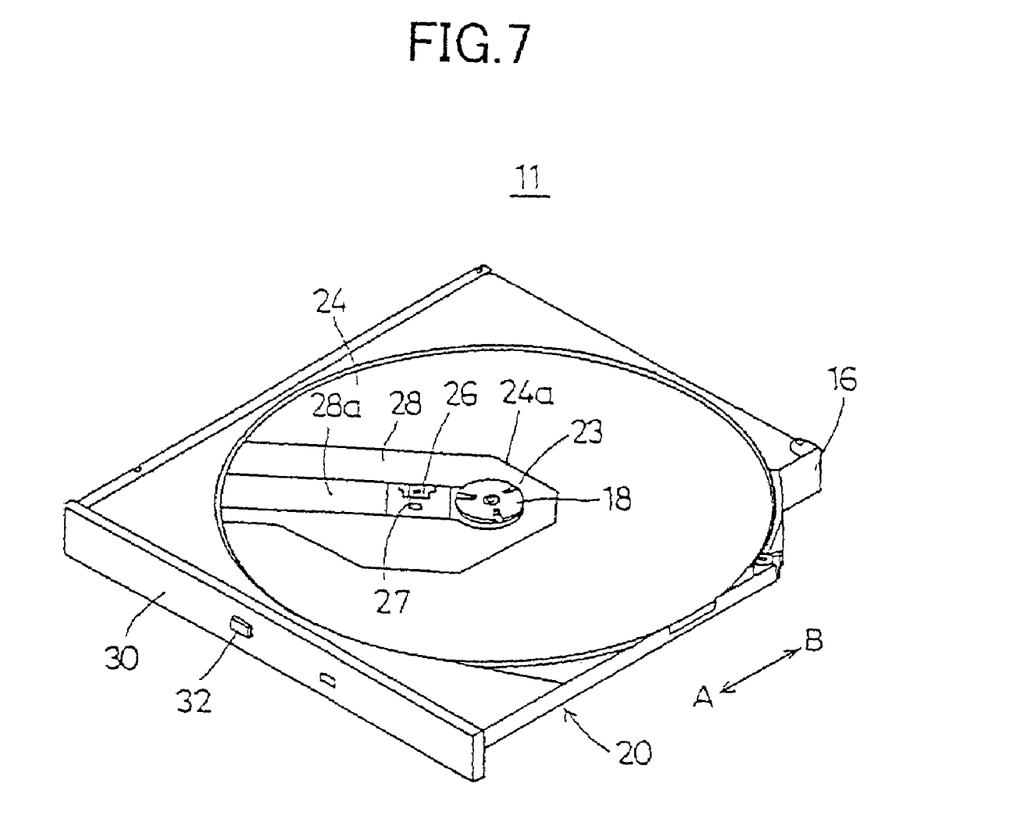
FIG. 7 is a perspective view showing the disk device of FIG. 5 with the tray being drawn back to the disk attached position.

A disk device 11 that is one embodiment of the present invention is shown in FIGS. 5 through 7. In FIG. 5, a tray 20 of the disk device 11 is pulled out to a disk replacing position where a disk is replaced. In FIGS. 6 and 7, the tray 20 of the disk device 11 is drawn back to a disk attached position where the disk is ready for reproducing of the disk data or data recording on the disk.

The disk device 11 is a drive device to which a storing medium is attached. For example, the storing medium to be attached to the disk device 11 is a CD-ROM, CD-R, CD-RW, DVD-ROM, and/or DVD-RAM. This disk device 11 has the tray 20 on which an optical disk 22 is placed. This tray 20 is moved to the disk attached position so that the data of the optical disk 22 can be reproduced, or data can be recorded on the optical disk 22. When the tray 20 is at the disk replacing position, the optical disk 22 is placed on the tray 20, or the optical disk 22 is removed from the tray 20.

The tray 20 includes a turning table 18 to which the optical disk 22 is attached, a spindle motor 19 (see FIG. 10) for rotating the turning table 18, and a clamping mechanism 23 for clamping the optical disk 22 to the turning table 18. The tray 20 further includes an optical pickup 26 for optically reading information on the optical disk 22, and/or optically recording information on the optical disk 22, and an optical pickup driving mechanism 34 for moving the optical pickup 26 in the radial directions of the optical disk 22 clamped to the turning table 18.

A disk accommodating part 24 is formed around the turning table 18 of the tray 20. The diameter of the disk accommodating part 24 is larger than that of the optical disk 22, and the optical disk 22 is attached in the disk accommodating part 24 via the clamping mechanism 23 and the turning table 18.

The optical pickup 26 is provided under the disk accommodating part 24 such that the optical pickup 26 can move in the radial directions of the optical disk 22 clamped to the turning table 18. The optical pickup 26 is accommodated under a recession part 24a of the disk accommodating part 24. The recession part 24a is covered with a pickup cover 28. An opening 28a is formed at the pickup cover 28 and the recession part 24a, and an object lens 27 of the optical pickup 26 moves along the region of the formed opening 28a.

Furthermore, the spindle motor 19 is provided under the turning table 18 so as to have the same axis as the center axis of the turning table 18. The optical disk 22 clamped to the turning table 18 and the clamping mechanism 23 are rotated by the spindle motor 19.

The tray 20 is supported by a guide rail mechanism 40 and 42 so as to be able to move relative to a chassis 16 in the directions indicated by the arrows A and B of FIGS. 5 to 7. The tray 20 can be manually moved between the disk replacing position and the disk attached position. The tray 20 is electrically connected to a circuit plate 12 disposed on the chassis 16 via a wiring plate 13. Since the wiring plate 13 is flexible, even when the tray 20 moves relative to the circuit plate 12 (the chassis 16), the electrical connection between the tray 20 and the circuit plate 12 can be securely maintained by the flexible wiring plate 13.

A front bezel 30 is provided at a front end of the tray 20. An ejecting button 32 that is pushed for pulling out the tray 20 from the chassis 16 is provided at the center part of the front bezel 30.

When the ejecting button 32 is operated, the tray 20 locked by a locking mechanism (not shown in the drawings) provided on the chassis 16 is released. In FIG. 5 where the tray 20 is released from the locking mechanism, the tray can be manually moved to the disk replacing position in the direction indicated by the arrow A with the tray 20 being supported by the guide rail mechanism 40 and 42.

Meanwhile, in order to draw back the tray 20 to the disk attached position, the front bezel 30 is pushed in the direction indicated by the arrow B by a user. In this manner, the tray 20 is moved to the disk attached position shown in FIGS. 6 and 7. At the disk attached position, the locking mechanism disposed on the chassis 16 prevents the tray 20 from moving.

The optical pickup driving mechanism 34 includes a pair of guide shafts 35 and 36 for guiding the movement of the optical pickup 26, a driving motor 37 for driving the optical pickup 26, and a transmission mechanism 38 for transmitting a rotational driving force from the driving motor 37 to the optical pickup 26.

Figure 8A:
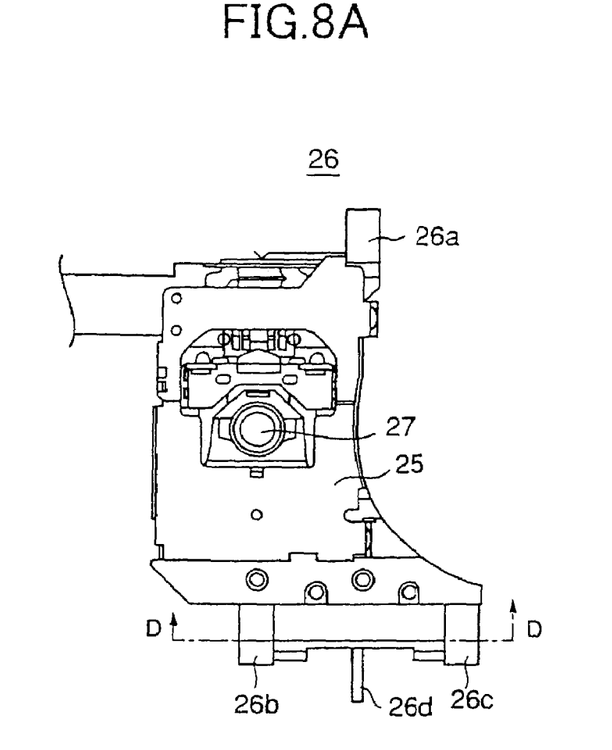
FIG. 8A is an enlarged plan view showing an optical pickup provided in the disk device of FIG. 5.
Figure 8B:
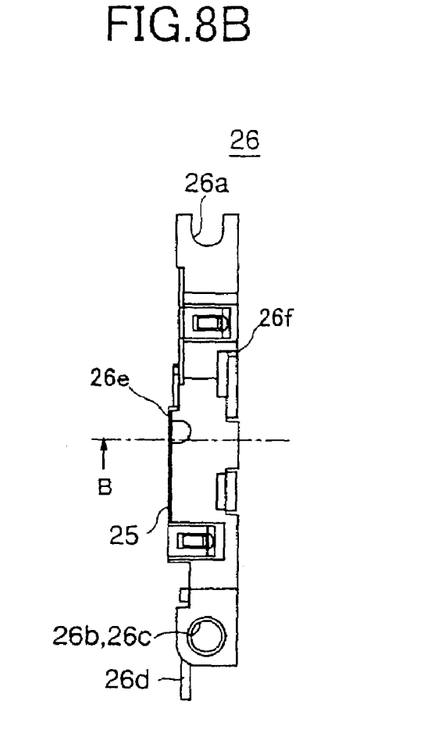
FIG. 8B is an enlarged elevation view showing the optical pickup provided in the disk device of FIG. 5 when viewed from the right side of the FIG. 8A.

As shown in FIGS. 8A and 8B, guided parts 26a through 26c that engage with the guide shafts 35 and 36 are respectively provided at both sides of the optical pickup 26. The movement of the guided parts 26a through 26c of the optical pickup 26 is guided by the guide shafts 35 and 36. In other words, the movement of the optical pickup 26 is guided by the guide shafts 35 and 36 via the guided parts 26a through 26c of the optical pickup 26. In this example, the guided parts 26b and 26c each have an opening that the guide shaft 36 penetrates with the guided parts 26b and 26c being able to move axially along the guide shaft 36, and the guided part 26a has a recession part that engages with the guide shaft 35 with the guided part 26a being able to move axially along the guide shaft 26c. The guided parts 26b and 26c have a center axis that is inclined from the direction perpendicular to the direction of the light emitted from the optical pickup 26. In this example, the center axis of the guided parts 26b and 26c penetrates the openings of the guided parts 26b and 26c. Advantages of this inclination of the center axis of the guided parts 26b and 26c will be described later in detail.

The transmission mechanism 38 includes a group of gears 38a for reducing the rotational speed of the driving motor 37, and a leading screw 38b that is driven and rotated by the driving motor 37 via the group of gears 38a. The optical pickup 26 includes an engaging part 26d for engaging with a spiral groove of the leading screw 38b. The rotational force of the driving motor 37 is transmitted to the leading screw 38b via the group of gears 38a to rotate the leading screw 38b so that the engaging part 26d can be driven to move, resulting in the optical pickup 26 being moved in the radial directions of the optical disk 22 clamped to the turning table 18. At this time, the movement of the optical pickup 26 is guided by the guide shafts 35 and 36 via the guided parts 26a through 26c of the optical pickup 26.

Figure 9:
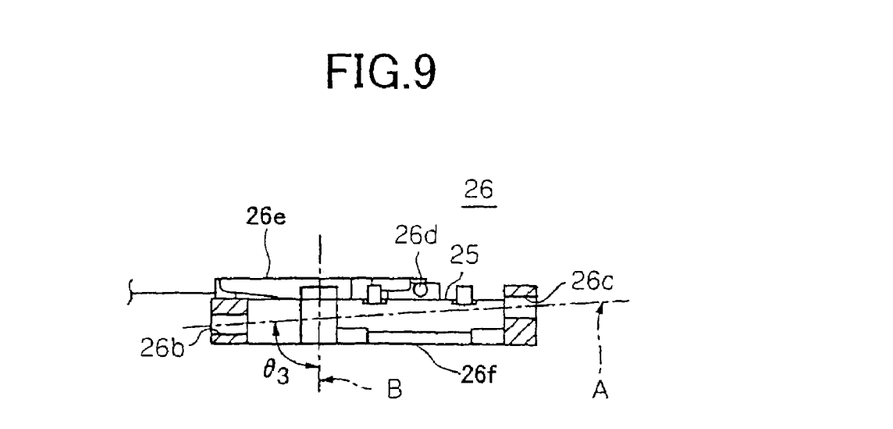
FIG. 9 is an enlarged sectional view taken along the line D—D in FIG. 8A and showing a part of guided parts that are a main part of the present invention.
Figure 10:
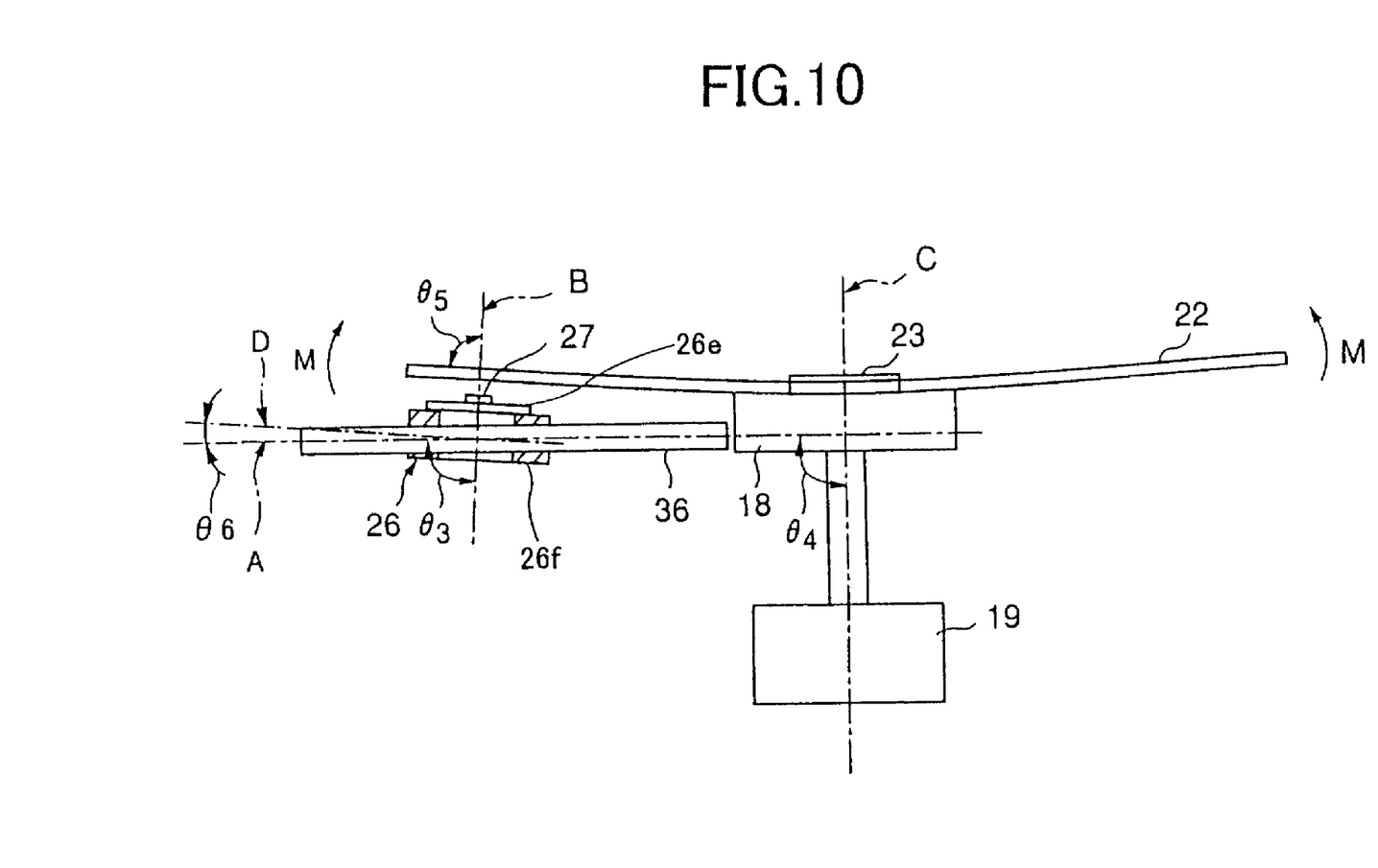
FIG. 10 is an illustration showing operation of the disk device of FIG. 5.

Function and advantages of the guided parts 26b and 26c formed on the optical pickup 26 will be described with reference to FIGS. 9 and 10. FIG. 9 is a sectional view taken along the line D—D of FIG. 8A. FIG. 10 is an enlarged view of the main part of the embodiment of the present invention, and shows the positional relation between the optical disk 22 and the optical pickup 26.

The center axis A indicated by the one dotted line A of FIGS. 9 and 10 that penetrates the center parts (in this example, the openings) of the guided parts 26b and 26c is shifted from the direction perpendicular to the light axis B indicated by the one dotted line B in FIGS. 9 and 10. The direction of the light axis B is the direction of the light emitted from the optical pickup 26. To be more specific, in FIGS. 9 and 10, the angle θ3 at which the direction of the center axis A crosses the light axis B is not a right angle (i.e., θ3≠90°). As shown in FIG. 10, the angle θ3 is set such that the light axis B makes a right angle with a surface of the optical disk 22, that is, the angle θ5 that the light axis B makes with the surface of the clamped optical disk 22 is a right angle (i.e., θ5=90°).

When the optical disk 22 is clamped by the clamping mechanism 23, the clamped optical disk is warped in the direction indicated by the arrows M in FIG. 10. The angle θ3 at which the direction of the center axis A crosses the light axis B is set such that the light axis B becomes perpendicular to the warped surface of the optical disk 22.

The above-mentioned angle setting will be described based on another standard. In this embodiment of the present invention, the center axis A (indicated by the one dotted line A of FIGS. 9 and 10) penetrating the center parts (in this example, the openings) of the guided parts 26b and 26c is adjusted so as to be shifted from the direction that is parallel with an upper surface 26e of the optical pickup 26 facing the optical disk 22 clamped by the clamping mechanism 23 (i.e., the center axis A is not in parallel with the upper surface 26e of the optical pickup 26). Specifically, the angle θ6 that the direction of the center axis A makes with the parallel surface D (indicated by the one dotted line D in FIG. 10) parallel with the upper surface 26e of the optical pickup 26 is not zero (i.e., θ6≠0). This angle θ6 is set such that the light axis B makes a right angle with the surface of the clamped optical disk 22. In other words, the angle θ6 is set such that the angle θ5 that the light axis B makes with the surface of the optical disk 22 clamped by the clamping mechanism 23 is a right angle (i.e., θ5=90°).

The angle θ6 that the direction of the center axis A penetrating the center parts (in this example, the openings) of the guided parts 26b and 26c makes with the parallel surface D parallel with the upper surface 26e of the optical pickup 22 is set such that the light axis B is perpendicular to the warped disk surface of the optical disk 22 clamped by the clamping mechanism 23.

The above-mentioned angle setting will be described based on still another standard. In this embodiment of the present invention, the center axis A (indicated by the one dotted line A of FIGS. 9 and 10) penetrating the center parts (in this example, the openings) of the guided parts 26b and 26c is shifted from the direction that is parallel with a lower surface 26f of the optical pickup 26.

To be more specific, the θ6 that the direction of the center axis A makes with the parallel surface D parallel with the lower surface 26f of the optical pickup 26 is not zero (i.e., θ6≠0). This angle θ6 is set such that the angle θ5 that the light axis B makes with the surface of the optical disk 22 clamped by the clamping mechanism 23 is equal to the right angle (i.e., θ5=90°).

The angle θ6 that the direction of the center axis A penetrating the center parts of the guided parts 26b and 26c makes with the parallel surface D parallel with the lower surface 26f of the optical pickup 26 is set such that the light axis B is perpendicular to the warped surface of the optical disk 22 clamped by the clamping mechanism 23 (as mentioned above, the direction of the light axis B is the direction of the light emitted from the optical pickup 26).

According to this embodiment of the present invention, the angle θ4 at which the direction of the center axis A indicated by the one dotted line A of FIGS. 9 and 10 crosses the center axis C (indicated by the one dotted line C of FIG. 10) of the rotational shaft of the spindle motor 19 is a right angle (i.e., θ4=90°).

For example, by adjusting an angle or inclination of a hole forming tool such as a drill when the openings at the guided parts 26b and 26c are formed by the hole forming tool, it is possible to easily incline the center axis A from the parallel surface M. Accordingly, when the center axis A penetrating the center parts (in this example, the openings) of the guided parts 26b and 26c is inclined relative to the parallel surface M, the processes for processing elements of the optical pickup 26 and the processes for assembling the optical pickup 26 do not increase in number, and do not become complicated. The setting of the above-mentioned angles θ3 and θ6 can be determined in advance by experiments.

As described above, the guided parts 26b and 26c have the center axis A that penetrates the center parts and is inclined from the direction perpendicular to the light axis B of which direction is the direction of the light emitted from the optical pickup 26 so that the light axis B can make an approximately right angle with the surface of the clamped optical disk 22. In another example, the direction of the center axis A is shifted from the direction parallel with the upper surface 26e of the optical pickup 26 so that the light axis B can make an approximately right angle with the surface of the clamped optical disk 22. In another example, the direction of the center axis A is shifted from the direction parallel with the lower surface 26f of the optical pickup 26 so that the light axis B can make an approximately right angle with the surface of the clamped optical disk 22. Accordingly, even if the optical disk 22 is warped when the optical disk 22 is clamped by the clamping mechanism 23, with a simple structure, the light emitted from the optical pickup 26 can be easily incident, at right angles, on the warped surface of the optical disk 22 clamped by the clamping mechanism 23.

According to a structure of this embodiment of the present invention, the center axis C (indicated by the one dotted line C in FIG. 10) of the rotational shaft of the spindle motor 19 extends vertically as in a conventional manner. Accordingly, when the size of the disk device 11 is made to be small, the optical disk 22 does not make contact with the upper case (not shown) of the disk device 11, preventing the optical disk 22 from being damaged by contacting against the upper case of the disk device 11.

According to the structure of this embodiment of the present invention, since the guide shafts 35 and 36 need not be inclined(that is, the guide shafts 35 and 36 have axes approximately perpendicular to the direction of the rotational shaft of the disk rotating mechanism including the spindle motor 19 and the like), accuracy in attaching each element to the optical pickup driving mechanism 34 is not reduced. Furthermore, according to this embodiment, since the object lens 27 of the optical pickup 26 need not be inclined, it is possible to maintain accuracy in a spot on the optical disk 22 being struck by the light from the optical pickup 26 that is reduced when the object lens 27 having coma aberration is inclined.

Furthermore, the guide shafts 35 and 36 may support the optical pickup 26 via the guided parts 26a, 26b, and 26c such that the optical pickup 26 can move axially relative to the guide shafts 35 and 36. The guide shafts 35 and 36 may be fixed at the predetermined positions in the disk device 11.

It should be noted that in the illustrations of FIGS. 9 and 10, the center axis A of the guided parts 26b and 25c is inclined exaggeratedly from the direction parallel with the upper surface and/or the lower surface of the optical pickup 26 so that the present invention can be more easily understood. However, in reality, the angle that the direction of the center axis A makes with the parallel surface D parallel to the upper surface and/or the lower surface of the optical pickup 26 is approximately 8 minutes to 10 minutes (8' to 10').

The present invention is not limited to the above-described embodiments, and may be embodied in other various specific forms without departing from the scope of the present invention.

This patent application is based on Japanese priority patent application No. 2002-001322 filed on Jan. 8, 2002, the entire contents of which are hereby incorporated by reference.

What is claimed is:

1. A disk device comprising:
an optical pickup that reproduces data of a clamped disk and includes a guided member; and
an optical pickup driving mechanism having a guide member for guiding movement of the optical pickup via the guided member of the optical pickup,
wherein the guided member of the optical pickup has a center axis inclined from a direction perpendicular to a first direction of light emitted from the optical pickup so that the direction of light emitted from the optical pickup can make an approximately right angle with a surface of the clamped disk and wherein the first direction of light emitted from the optical pickup is not perpendicular to a second direction of the center axis of the guided member in a view of the optical pickup from a direction perpendicular to both the first direction and the second direction.

2. The disk device according to claim 1, wherein the guide member includes a guide shaft.

3. The disk device according to claim 1, wherein the guided member of the optical pickup movably engages with the guide member relative to the guide member.

4. The disk device according to claim 2, wherein the guided member of the optical pickup has an opening forming part that the guide shaft penetrates with the guided member being able to move axially relative to the guide shaft, and the center axis of the guided member penetrates the opening forming part of the guided member.

5. The disk device according to claim 1, wherein the guide member includes a pair of guide shafts, the guided member of the optical pickup includes first, second, and third guided parts, the first guided part engages with one of the guide shafts, the second and third guided parts have opening forming parts, respectively, that the other of the guide shafts penetrates, the first, second, and third guided parts are able to move axially relative to the pair of the guide shafts, and the center axis of the guided member penetrates the opening forming parts of the second and third guided parts.

6. The disk device according to claim 1, further comprising a disk rotating mechanism for clamping and rotating the disk, wherein a rotational shaft of the disk rotating mechanism extends in a direction approximately perpendicular to the direction of the center axis of the guided member.

7. The disk device according to claim 6, wherein the guide member has an axis approximately perpendicular to a direction of the rotational shaft of the disk rotating mechanism.

8. The disk device according to claim 1, wherein the optical pickup driving mechanism moves the optical pickup in a radial direction of the clamped disk.

9. The disk device according to claim 1, wherein the disk device reproduces the data of the clamped disk, and records data on the clamped disk.

10. The disk device according to claim 1, wherein the optical pickup driving mechanism guides movement of the optical pickup in a direction of the center axis of the guided member.

11. The disk device according to claim 1, wherein the guide member supports the optical pickup via the guided member with the optical pickup being able to move relative to the guide member.

12. A disk device comprising:
a disk rotating mechanism for clamping a disk and rotating the clamped disk;
an optical pickup that reproduces data of the clamped disk and includes a guided member; and
an optical pickup driving mechanism that includes a guide member for guiding movement of the optical pickup via the guided member of the optical pickup,
wherein the guided member of the optical pickup has a center axis inclined from a direction parallel with a surface of the optical pickup that faces the clamped disk so that a direction of light emitted from the optical pickup can make an approximately right angle with a surface of the disk and the center axis of the guided member is not parallel to an upper surface of the optical pickup facing the disk.

13. The disk device according to claim 12, wherein the guide member includes a guide shaft.

14. The disk device according to claim 13, wherein the guided member of the optical pickup has an opening forming part that the guide shaft penetrates with the guided member being able to move axially relative to the guide shaft, and the center axis of the guided member penetrates the opening forming part of the guided member.

15. The disk device according to claim 12, wherein the disk rotating mechanism includes a spindle motor for rotating the clamped disk, and a rotational shaft of the spindle motor extends in a direction approximately perpendicular to the direction of the center axis of the guided member of the optical pickup.

16. The disk device according to claim 12, wherein the center axis of the guided member of the optical pickup is shifted by an angle of approximately 8 minutes to 10 minutes from the direction parallel with the surface of the optical pickup that faces the clamped disk so that the direction of light emitted from the optical pickup can make an approximately right angle with the surface of the clamped disk.

17. A disk device comprising:
a disk rotating mechanism for clamping a disk and rotating the clamped disk;
an optical pickup that includes a guided member, an upper surface facing the clamped disk, and a lower surface, and reproduces data of the disk; and
an optical pickup driving mechanism including a guide member for guiding movement of the optical pickup via the guided member of the optical pickup,
wherein the guided member of the optical pickup has a center axis inclined from a direction parallel with the lower surface of the optical pickup so that a direction of light emitted from the optical pickup can make an approximately right angle with a surface of the clamped disk and the center axis of the guided member is not parallel to a lower surface of the optical pickup.

18. The disk device according to claim 17, wherein the guide member includes a guide shaft.

19. The disk device according to claim 18, wherein the guided member of the optical pickup has an opening forming part that the guide shaft penetrates with the guided member being able to move axially relative to the guide shaft, and the center axis of the guided member penetrates the opening forming part of the guided member.

20. The disk device according to claim 17, wherein the center axis of the guided member of the optical pickup is shifted by an angle of approximately 8 minutes to 10 minutes from the direction parallel with the lower surface of the optical pickup so that the direction of light emitted from the optical pickup can make an approximately right angle with the surface of the clamped disk.

* * * * *